April 11, 1961 C. J. ZARCONE ET AL 2,979,702

BINARY DATA TRANSLATING DEVICE

Filed June 29, 1959 2 Sheets-Sheet 1

INVENTOR.
C. J. ZARCONE
B. A. HARRIS

BY Richard G. Stahr
ATTORNEY

April 11, 1961 C. J. ZARCONE ET AL 2,979,702

BINARY DATA TRANSLATING DEVICE

Filed June 29, 1959 2 Sheets-Sheet 2

United States Patent Office 2,979,702

Patented Apr. 11, 1961

2,979,702

BINARY DATA TRANSLATING DEVICE

Carl J. Zarcone and Ben A. Harris, Rochester, N.Y., assignors to General Dynamics Corporation, Rochester, N.Y., a corporation of Delaware Filed June 29, 1959, Ser. No. 823,473

3 Claims. (Cl. 340—174)

Figures 1, 2:
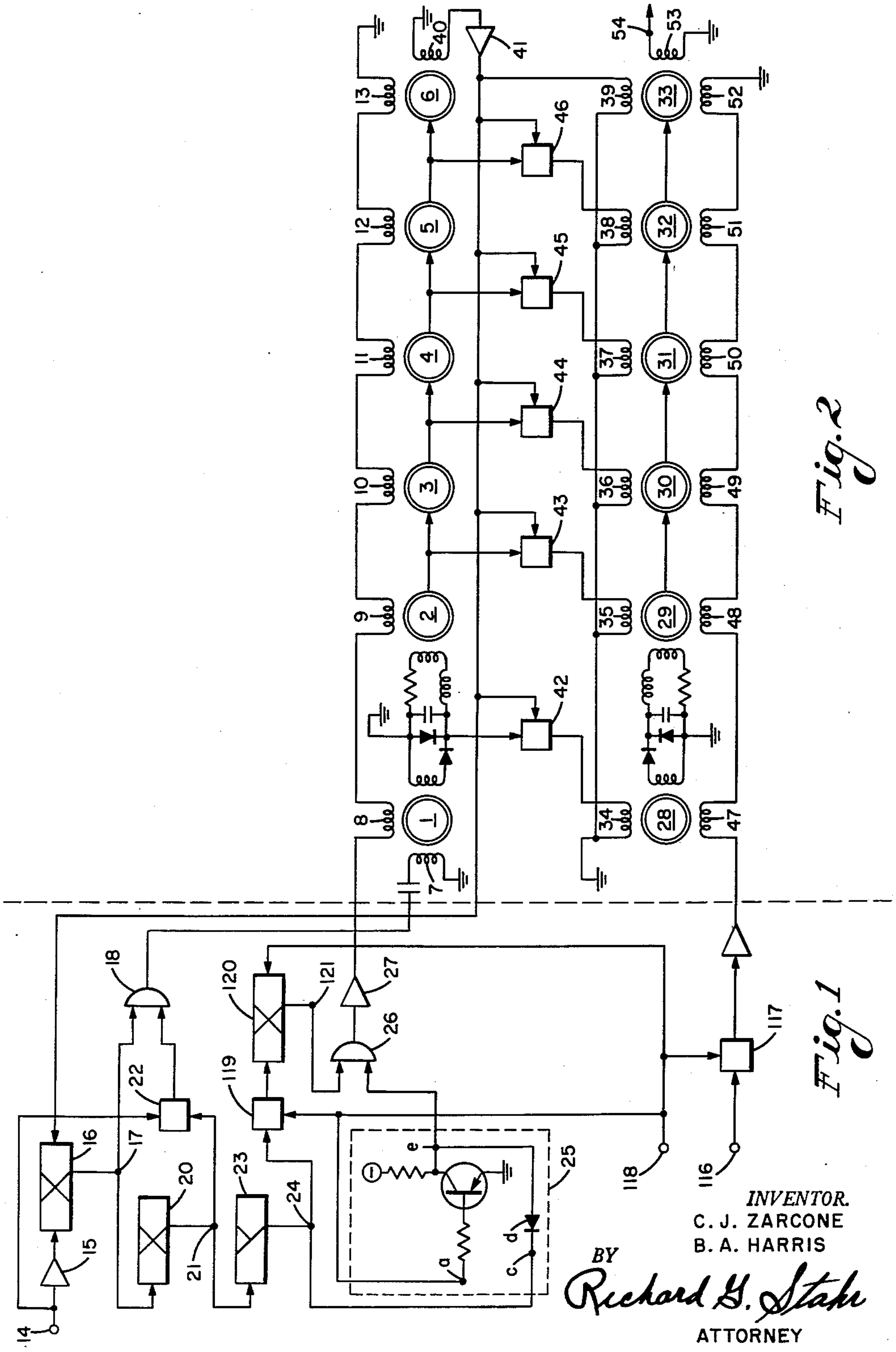

The present invention relates to binary data translating devices and, more specifically, to a binary data translating device of the type which may store binary information bits which are serially received at one rate and from which the stored binary information bits may be serially removed at another rate.

In applications employing information which is expressed in binary form, it is frequently necessary to accumulate information at a rate which is slower than that at which it is utilized or, in other instances, it may be necessary to accumulate information at a rate faster than that at which it is utilized.

This requirement is particularly applicable in the field of communications, both wired and radiant, wherein messages originating from several different sources may be transmitted to a remote location on a time sharing basis in which each generating source is assigned a specific time position within a larger increment of time. Systems of this type are generally termed "time division multiplexing systems."

In systems of this type, the information is transmitted from one position to a remote location in a much shorter time increment than is required to accumulate the information. For example, a message or a character is transmitted at a much greater rate than that at which an operator can manually originate it through the operation of a teletypewriter device. Similarly, at the receiving location, the same mechanical limitations in the readout and printing equipment as was inherent in the originating equipment requires that the information transmitted be utilized at a much slower rate than that at which it was received. In view of the widespread use of time division multiplexing systems of this type, the requirement of a binary data translating device which may store binary information bits which are serially received at one rate and from which they may be serially removed at another rate which is economical in design and reliable in operation is apparent.

In view of this, it is an object of this invention to provide an improved binary data translating device of the type which may store binary information bits which are serially received at one rate and from which the stored binary information bits may be serially removed at another rate.

It is another object of this invention to provide an improved binary data translating device of the type which may store binary information bits which are serially received at one rate and from which the stored binary information bits may be serially removed at a higher rate.

It is another object of this invention to provide an improved binary data translating device of the type which may store binary information bits which are serially received at one rate and from which the stored binary information bits may be serially removed at a slower rate.

In accordance with this invention, a first storage circuit which is adapted to accept in series and retain binary information bits of characters expressed in binary form is interconnected with a second storage circuit device which is adapted to retain the binary information bits applied thereto and from which such binary information bits may be removed in series. Provision is made for the parallel transfer of the binary information stored in the first storage circuit to the second storage circuit at such time that the storage capacity of the first storage circuit is exhausted. The binary information which is now stored in the second storage circuit may be serially removed therefrom at a greater or lower rate, depending upon the requirements of the application.

Figures 3, 4:
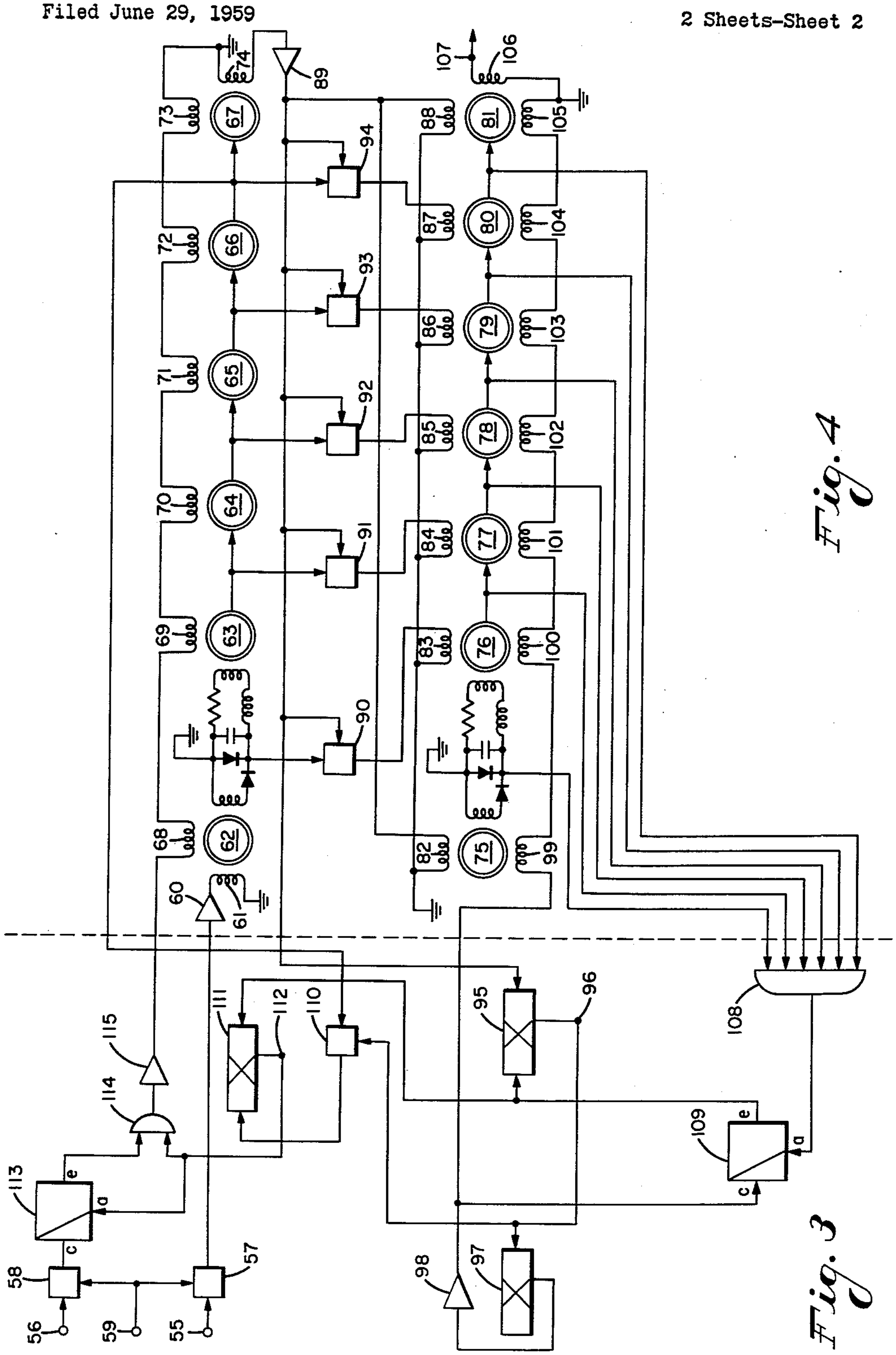

For a better understanding of the present invention, together with further objects, advantages and features thereof, reference is made to the following description and accompanying drawings, in which:

Figures 1 and 2 are a preferred embodiment of the translator device of the present invention; and Figures 3 and 4 are another embodiment of the translator device of the present invention.

Without intention or inference of a limitation thereto, the operation of the binary data translating device of this invention will be described relative to a time division multiplex application in the field of communications.

At any given center within a complex communicating system, messages may be originated at a plurality of sources within the center for transmission to a remote location. Since the transmission rate in a modern communication system is much greater than the rate at which messages may be generated by operators, only one transmitting circuit may be required to accommodate the combined efforts of many operators originating messages. In systems of the time division multiplexing type, each originating station is assigned a specific time position within a larger time increment during which time the messages originating from that station are transmitted. Generally, only one character at a time is transmitted during the time position allotted to any one of the originating sources and, upon receipt at the remote location, these signal characters are demultiplexed and accumulated in storage devices corresponding to the time positions in which they are present. As the several characters are received, and retained in the storage devices assigned to the time position which they occupy, a complete message originating at any of the originating stations is ultimately assembled in the corresponding storage device at the receiving station.

For purposes of illustrating the device of this invention, therefore, it will be assumed to be used within a larger time division multiplexing system in which each originating station at the transmitting location contains the equipment as illustrated in Figures 1 and 2 and that only one character is transmitted during the time position allotted to any originating station.

To accumulate the binary data as it is originated, a circuit which is adapted to accept in series and retain binary information bits of characters expressed in binary form is employed. This circuit may be in the form of a shift register circuit composed of a series of binary elements, each possessing two stable conditions of operation, wherein adjacent ones are interconnected in such a manner that the stable state of any one may be transferred to the next succeeding one of the circuit through the simultaneous application of a shift pulse to all of the elements and will hereinafter be referred to as the read-in storage circuit. While any one class of the binary element groups may be selected to make up this circuit, it has herein been assumed that these elements be of the magnetic core type, each composed of a magnetic material possessing substantially square hysteresis loop characteristics, two stable conditions of saturation generally termed the "1" state and the "0" state, and are illustrated by reference numerals 1–6, inclusive. While the circuitry required to effect the transfer of the stable state of one core to the next succeeding core has been illustrated in detail in Figure 2 between cores 1 and 2, in the interest of reducing drawing complexity it has thereafter been indicated only as an arrow in that this circuitry is identical between every other pair of adjacent cores. Although either stable state may be selected to represent the "mark" polarity bits of a binary code, it will herein be assumed that the "1" state be selected to indicate the "mark" polarity bits. Coupled to the initial core 1 is an input coupling winding 7 through which the serial binary code information bits are presented to the read-in storage circuit comprising cores 1–6, inclusive. The polarity sense of this coupling winding is such that upon energization by a "mark" polarity bit, the "1" stable state will be produced in core 1. Coupled to each of cores 1, 2, 3, 4, 5 and 6 is a shift circuit coupling winding 8, 9, 10, 11, 12 and 13, respectively. The sense of these coupling windings is such that upon energization by a shift pulse, the "0" stable state is produced in the cores to which they are coupled.

In teletypewriter applications, each character is preceded by a start-of-character "space" information bit and, assuming that the teletypewriter code is a five-bit-per-group binary code, the read-in storage circuit must have at least six stages, one for each information bit of the binary code group and for the start of character signal.

As the serial teletypewriter code is applied to input terminal 14, the start-of-character "space" signal is inverted in a conventional amplifier, the details of which form no part of this invention and are well known in the art, indicated in block form by reference numeral 15. This inverted signal is applied to an input terminal of a conventional flip-flop circuit, the details of which form no part of this invention and are well known in the art, indicated in block form by reference numeral 16. Flip-flop circuits of this type possess two stable conditions of operation which may be alternately produced through the alternate application of a trigger signal to one input terminal and to the other input terminal. For purposes of illustration, the two stable conditions will hereinafter be referred to as the "set" and "reset" conditions. Depending upon the type transistor used in the flip-flop circuitry, the potential of the signal appearing at output terminal 17 thereof will be positive or negative when the flip-flop is in one of the stable states and ground when the flip-flop is in the other stable state. For purposes of illustration, it will be assumed that the signal potential appearing at output terminal 17 will be negative when flip-flop 16 is in the "set" state and ground when flip-flop 16 is in the "reset" state. As the inverted start of character signal is applied to one of the input terminals of flip-flop 16, thereby setting flip-flop 16, the potential of the signal appearing at output terminal 17 thereof will be negative. This negative potential signal is passed by an OR gate, the details of which form no part of this invention and are well knowin in the art, illustrated in block form by reference numeral 18, and is applied to input coupling winding 7 of magnetic core 1, thereby energizing coupling coil 7 in a polarity sense for producing in magnetic core 1 the "1" stable state.

During the period that flip-flop 16 is in the reset condition, the ground potential signal present upon output terminal 17 is applied to the input terminal of a free-running multivibrator circuit, the details of which are well known in the art and form no part of this invention, illustrated in block form by reference numeral 20. This ground potential signal, being applied to the base of one of the transistors of this multivibrator circuit, biases this transistor to nonconduction, thereby preventing the operation of free-running multivibrator 20. However, as the inverted start-of-character pulse resets flip-flop 16, the negative potential signal present upon output terminal 17 is applied to the base of the transistor, thereby biasing it to conduction and permitting multivibrator 20 to oscillate at the rate at which the teletypewriter binary information bits are received through input terminal 14. The signals produced at output terminal 21 thereof and the information bits of the incoming binary code are applied to respective terminals of a two-input AND gate which, since the details are well known in the art and form no part of this invention, is illustrated in block form by reference numeral 22. Upon the coincident presence of a signal from output terminal 21 and a "mark" information bit in the received binary code, a signal is gated through two-input AND gate 22 and OR gate 18 which energizes input coupling coil 7 of magnetic core 1 in a polarity sense for producing therein the "1" condition of operation, selected to denote the presence of a "mark" polarity bit.

To produce the necessary shift pulses for successively transferring the condition of operation of each of magnetic cores 1–6, inclusive, to the next succeeding one, the signals present upon output terminal 21 of free-running multivibrator 20 are applied to the input circuit terminal of a conventional delay multivibrator which, since the details are well known in the art and form no part of this invention, is illustrated in block form by reference numeral 23. Multivibrators of this type are normally in a stable condition of operation or state but may be triggered to an alternate state through the application of a trigger signal, in which alternate state it will remain for a period of time as designed into the circuitry, upon the expiration of which the multivibrator will return to its normal stable state. The signal from output terminal 21 applied to the input terminal of delay multivibrator 23 will trigger delay multivibrator 23 to its alternate state for a period of time designed into the circuit to equal approximately one-half the length of the binary information bits being received through input terminal 14. The signal present upon output terminal 24 of delay multivibrator 23, during the period it is in the alternate state, is applied to an inhibitor circuit illustrated in detail within the rectangle defined by the dashed lines and indicated by reference numeral 25 in Figure 1 where the several terminals are denoted by letters. In the absence of a signal upon terminal *a*, the base and emitter of the transistor are at essentially the same potential, a condition which does not satisfy the base-emitter bias requirements for conduction through a type P–N–P transistor, therefore, the transistor is in a condition of nonconduction. At this time, a negative signal impressed upon input terminal *c* will be passed by diode *d* and will appear upon the output terminal *e* of the inhibitor. However, should a negative potential be applied to input terminal *a* and the base of the transistor, thereby rendering the transistor negative in respect to the emitter, a condition which satisfies the base-emitter bias requirements for conduction through a type P–N–P transistor, the transistor would be rendered conductive which would place the potential of terminal *e* at substantially ground potential, a condition which would preclude the passage of a negative signal pulse present upon input terminal *c* through diode *d*. Therefore, the negative signal present upon output terminal 24 of delay multivibrator 23 will be passed through inhibitor 25 since, it is assumed at this time, there is no signal present upon input terminal *a*, and will appear at one of the input terminals of a two-input OR gate which, since the details are well known in the art and form no part of this invention, is indicated in block form by reference numeral 26. This signal is transmitted through OR gate 26 to the shift coupling windings 8, 9, 10, 11, 12 and 13 of magnetic cores 1, 2, 3, 4, 5 and 6, respectively, of the read-in storage circuit. This shift pulse may be amplified by a conventional amplifier 27, if necessary.

From this description, it is apparent that immediately after the receipt of each binary information bit, a shift pulse is produced by delay multivibrator 23 which will transfer the stable state of each of the magnetic cores to the next succeeding one before the occurrence of the next binary information bit upon input terminal 14. Therefore, at the conclusion of the receipt of the five-bit-per-group binary code, the "1" condition of operation originally produced in core 1 by the inverted start of signal "space" bit now appears as a "1" condition of operation in magnetic core 6.

Associated with the read-in storage circuit is a second similar shift register circuit or readout storage circuit which is adapted to store binary information bits applied thereto and is comprised of a series of binary elements, herein assumed also to be magnetic cores indicated by reference numerals 28, 29, 30, 31, 32 and 33. The adjacent members of this circuit are also interconnected in such a manner that the stable state of one may be transferred to the next succeeding one through a transfer circuit as detailed between elements 28 and 29. As this circuitry is identical between every other adjacent pair, in the interest of reducing drawing complexity the circuitry has been illustrated as arrows between the other adjacent pairs. Each of the magnetic cores 28–33, inclusive has an input coupling winding associated therewith illustrated by reference numerals 34, 35, 36, 37, 38 and 39, respectively.

As the "1" stable state originally present in magnetic core 1 has been successively stepped to magnetic core 6 of the read-in storage circuit after five shift pulses from delay multivibrator 23, the storage capacity of the read-in storage circuit has been exhausted. The sixth shift pulse emanating from delay multivibrator 23 reverses the stable state of core 6 from the "1" to the "0" state which produces a transfer signal pulse in output winding 40 thereof, in a manner well known in the art. This transfer signal may be amplified in a conventional amplifier, illustrated in block form by reference numeral 41, and applied through input coupling winding 39 in a polarity sense for producing within magnetic core 33 the "1" stable state. Simultaneously, this transfer signal pulse is applied to the reset terminal of flip-flop 16 thereby reversing its state from the "set" to the "reset" condition and establishing a ground signal potential upon output terminal 17. This ground signal potential upon output terminal 17 of flip-flop 16 serves to stop the operation of free-running multivibrator 20 and hence the production of further shift pulses by delay multivibrator 23.

So that the binary information stored in the read-in storage circuit may be transferred in parallel to the readout storage circuit in response to the transfer signal produced in output winding 40 of magnetic core 6, there is provided a transfer circuit interconnecting the output of each of the magnetic cores of the read-in storage circuit with the input coupling winding of the corresponding magnetic core of the readout storage circuit. Each of these transfer circuits include a conventional two-input AND gate circuit. As AND gate circuits of this type are well known in the art and the details form no part of this invention, they have herein been illustrated in block form by reference numerals 42, 43, 44, 45 and 46. As the sixth shift pulse produced by delay multivibrator 23 advances the binary information contained in each of the magnetic cores of the read-in storage circuit to the next succeeding core and the attendant production of a transfer signal in output coupling winding 40 of magnetic core 6, an output signal is produced in the output coupling winding of each of these magnetic cores which is in the "1" stable state, selected to denote "mark" polarity bits. This signal is applied to one terminal of the associated two-input AND gate circuit simultaneously with the transfer signal which is applied to the other input terminal of all of the AND gate circuits, as indicated. At all times that the transfer signal is absent, the respective AND gate circuits will be ineffective to pass these signals. Hence, the readout storage circuit elements remain unaffected. However, with the coincident presence of the transfer signal, those AND gate circuits to which an output signal is applied from the associated magnetic core of the read-in storage circuit will conduct the signal therethrough, thereby energizing the input coupling winding of the corresponding magnetic member of the readout storage circuit in a polarity sense for producing therein the "1" stable state. With these transfer circuits interconnecting the read-in and readout storage circuits, the binary information stored in each of the magnetic cores of the read-in storage circuit is transferred to the corresponding magnetic member of the readout storage circuit in response to the transfer signal.

So that the binary information stored in the readout storage circuit may be removed therefrom in series, a source of shift pulses is required to simultaneously energize each of shift pulse coupling windings 47, 48, 49, 50, 51 and 52 of magnetic members 28, 29, 30, 31, 32 and 33, respectively, in a polarity sense for producing therein the "0" stable state. In this manner, similar to that of the read-in storage circuit, the stable state of each of magnetic members 28–33, inclusively, is successively stepped to the next member with each shift pulse energizing shift pulse coupling windings 47–52, inclusive, with the attendant production of an output signal pulse in output coupling winding 53 of core 33 each time that core 33 is reversed from the "1" state to the "0" state. This train of pulses may be taken off output coupling winding 53 through output terminal 54 and applied to external equipment, not shown.

To provide this source of readout pulses, the master oscillator which supplies the timing clock pulses for the complete transmitting system may be connected to input terminal 116. So that these shift pulses from the master oscillator will not be effective to transfer the information contained in the readout storage circuit except at the time position within the larger time increment which has been assigned the channel to which this equipment is common, a two-input AND gate 117 is employed. This AND gate is ineffective to pass the shift pulses present upon input terminal 116 without the coincident presence of a signal at its other input terminal. During the time position within the larger time increment which has been selected to be assigned to the channel to which the equipment herein shown is common, a channel selector pulse may be applied to input terminal 118 and arranged to be of sufficient length to permit the passage through input AND gate 117 of six pulses from the master clock through input terminal 116. At the conclusion of this increment of time, the channel selector pulse is removed from input terminal 118, thereby disabling two-input AND gate 117 with the resulting cessation of shift pulses being applied to shift coupling windings 47–52, inclusive.

Since the signals produced by the master oscillator clock are at a much higher rate than the signals produced by free-running multivibrator 20, the information contained in magnetic members 28–33, inclusive, is read out at a much greater rate than that at which it was accumulated in magnetic members 1–6, inclusive. So that the binary information contained in the read-in storage circuit may not be transferred to the readout storage circuit during the time that the channel selector signal is present upon input terminal 118, the shift pulses produced upon output terminal 24 of delay multivibrator 23 and the channel selector signal are applied to respective input terminals of a conventional two-input AND gate illustrated in block form by reference numeral 119. At all times that the channel selector signal is absent, AND gate 119 is ineffective to conduct therethrough the shift pulses produced by delay multivibrator 23. However, upon the occurrence of the channel selector signal, two-input AND gate 119 is enabled, thereby conducting therethrough the shift pulse present upon output terminal 24 of delay multivibrator 23 which serves to trigger flip-flop 120 to its "set" state. At the same time, the channel selector signal is applied to input terminal *a* of inhibitor gate 25, thereby biasing the base of the transistor negative in respect to the emitter, a condition which satisfies the base-emitter bias requirements for conduction through a type P–N–P transistor. At this time, point *e* goes to substantially ground potential, thereby preventing the passage of shift pulses from output terminal 24 of delay multivibrator 23 which are applied to terminal *c* of inhibitor gate 25. Therefore, no shift pulse is applied to the shift coupling windings 8–13, inclusive, during this period. As the channel selector signal is removed at the conclusion of the time position assigned to this channel, flip-flop 120 is triggered to its reset position by the trailing edge of this signal. In the reset position, the signal appearing at output terminal 121 thereof goes from a ground potential to a negative potential, thereby producing a shift pulse which is applied to shift coupling windings 8–13, inclusive, through two-input OR gate 26 and amplifier 27. In this manner, therefore, the shift pulse produced by delay multivibrator 23 during the time that the readout storage circuit is being interrogated is merely stored temporarily in flip-flop 120 from which it is applied to the read-in storage circuit at the conclusion of the interrogation of the readout storage circuit.

To describe another embodiment of a novel translator device of this invention in which the binary information may be removed from the translator at a rate slower than that at which it is accumulated, it will be assumed that the signals removed from output terminal 54 of Figure 2 are accumulated in a read-in storage circuit at a receiving station. Referring now to Figures 3 and 4, the binary signals removed from output terminal 54 of Figure 2 are received through input terminal 55 of Figure 3. Through the use of other equipment which has not been shown in that it does not form any part of this invention, the received binary data is utilized to produce the required shift pulses which are applied to input terminal 56. Both terminals 55 and 56 are connected to respective input terminals of conventional two-input AND gates 57 and 58, respectively. During the time position within the larger time increment which is assigned to the channel associated with the equipment of Figures 3 and 4, a channel selector pulse is applied to terminal 59. This terminal is connected to the other input terminals of AND gates 57 and 58. With the coincident presence of a channel selector signal and a serial binary code and shift signals upon terminals 55 and 56, respectively, gates 57 and 58 are enabled, thereby permitting the passage of these signals therethrough. The binary signals received upon input terminal 55 are passed through a conventional amplifier 60 and applied to input coupling winding 61 of the initial binary element 62 of a read-in storage circuit comprised of magnetic cores 62, 63, 64, 65, 66 and 67. This storage circuit is similar in operation to that described in regard to the read-in storage circuit of Figure 2 in that the stable state of every magnetic member may be transferred to the next succeeding member through the application of shift pulses to respective shift pulse windings 68, 69, 70, 71, 72 and 73. A signal representing a "mark" polarity bit received at input circuit terminal 55 is conducted through gate 57 and amplifier 60 and applied to input coupling winding 61 of magnetic core 62, thereby energizing this coupling winding in a polarity sense for producing in element 62 the "1" stable state selected to denote a "mark" polarity bit. As the six-bit-per-group binary code signal is received, with the attendant shift pulses, the stable state initially produced in member 62 is successively transferred from member to member of the read-in storage circuit until such time that its storage capacity is exhausted. The sixth shift pulse, therefore, reverses the stable state of element 67 from the "1" to the "0" stable state thereby producing an output transfer signal in output coupling winding 74.

The readout storage circuit is similar to that as described in regard to Figure 2; however, an additional magnetic member has been added. This has been done for the purpose of illustrating an alternate method for determining when all of the information contained within the readout storage circuit has been removed without applying thereto a specific number of readout shift pulses as was done with the readout circuit as described in Figure 2. Each of the magnetic members 75, 76, 77, 78, 79, 80 and 81 of the readout storage circuit has coupled thereto an input coupling winding 82, 83, 84, 85, 86, 87 and 88, respectively. As the transfer signal is produced in output coupling winding 74 of member 67 of the read-in circuit, and amplified in a conventional amplifier 89, it is applied to input coupling windings 82 of member 75 and 88 of member 81, thereby energizing these input coupling windings in a polarity sense for producing in respective members 75 and 81 the "1" stable state. As with the device of Figure 2, so that the information contained in the read-in storage circuit may be transferred in parallel to the readout storage circuit, the required transfer circuitry is provided. Interposed between the output coupling winding of each member of the read-in storage circuit and the input coupling winding of the corresponding member in the readout storage circuit is a conventional AND gate illustrated in block form by reference numerals 90, 91, 92, 93 and 94. As in the case of the read-in storage circuit of Figure 2, with each reversal state from the "1" to the "0" state of any member of the read-in storage circuit, an output signal is produced in the associated output coupling windings. However, in the absence of a transfer signal, the corresponding gate circuits are disenabled and the magnetic member of the readout storage circuit remain unaffected. As a transfer signal is produced and is coincidentally applied to all of the gates 90–94, inclusive, with the reversal of state from the "1" to the "0" state of any of the members in the read-in storage circuit an output signal will be produced which is passed by the associated gate to energize the coupling winding of the corresponding magnetic member of the readout storage circuit in a polarity sense for producing therein the "1" stable state, selected to denote the "mark" polarity bits. In this manner, therefore, the information retained in the read-in storage circuit may be transferred in parallel to the readout storage circuit where it may be stored until such time as it may be utilized.

The transfer signal is also applied to an input terminal of flip-flop 95 which, being conventional in design and forming no part of this invention, has herein been illustrated in block form. As flip-flop 95 is triggered to its reset state, the signal present upon its output terminal 96 goes from a ground potential to a negative potential, which is applied to the input terminal of a free-running multivibrator 97 which, since the details are well known in the art and form no part of this invention, has herein been illustrated in block form. As free-running multivibrator 97 is enabled, it begins oscillation, thereby producing readout shift pulses which may be amplified in a conventional amplifier 98 and applied simultaneously to the readout shift coupling windings 99, 100, 101, 102, 103, 104 and 105 coupled to respective magnetic members 75, 76, 77, 78, 79, 80 and 81 of the readout storage circuit. As the information contained in the readout storage circuit is successively stepped along from member to member in series, and the condition of operation of the final magnetic member 81 is reversed from the "1" to the "0" condition, an output pulse, denoting a "mark" polarity bit is produced in output coupling winding 106 thereof. These series of pulses, denoting "mark" polarity bits, may be taken from output terminal 107 and applied serially to external equipment, not shown. In this instance, the frequency of free-running multivibrator 97 may be much slower than the frequency of the received serial binary information bits; hence, the information may be removed from the translator device of this invention at a lower rate than that at which it was accumulated in the read-in storage circuit portion.

As may be noted, the output circuit of each element of the readout storage circuit is connected to a six input OR gate 108 which, being conventional in design and well known in the art, has herein been illustrated in block form. The purpose of placing magnetic member 75 in the "1" condition of operation through the energization of its input coupling winding 82 by the transfer signal produced in output coupling winding 74 of element 67 was to provide a method for determining when the information contained in the readout storage circuit had been exhausted. By placing element 75 initially in the "1" condition of operation, it is assured that there will be a reversal of stable state of at least one of the magnetic members of the readout storage circuit with every one of seven readout shift pulses as this stable state is transferred from member to member of the readout storage circuit with each readout shift pulse. This reference pulse is conducted through OR gate 108 and applied to input terminal *a* of an inhibitor gate 109, the details of which are identical to inhibitor 25 of Figure 1 and is herein shown in block form. With this disenabling signal applied to the base of the transistor of inhibitor gate 109, the shift pulses produced by free-running multivibrator 97, connected to the input circuit terminal of disenabled inhibitor gate 109, cannot be passed therethrough during the time that there is information contained within the readout register. At the conclusion of the seventh shift pulse, with no output signal present to the input circuit terminals of OR gate 108, inhibitor gate 109 is enabled, thereby permitting the passage therethrough of a shift pulse from free-running multivibrator 97. As inhibitor gate 109 has now been enabled, this shift pulse is passed therethrough and applied to one of the input terminals of flip-flop 95, thereby triggering it to its "set" condition. In this condition, the signal present upon output terminal 96 thereof goes from a negative potential to a ground potential, which is applied to the input terminal of free-running multivibrator 97. This ground potential biases one of the transistor bases contained within the free-running mulivibrator to nonconduction, thereby stopping the operation of free-running multivibrator 97 and ceasing the production of readout shift pulses.

The provision of an additional element in the readout shift register which is initially placed in the "1" state provides a convenient method for determining when the readout storage circuit has been exhausted. Another possibility, of course, would be similar to that described in connection with Figure 2 where the readout pulses applied to the readout storage circuit may be arranged to be of a number which would insure that this register has been exhausted.

To prevent a transfer of information from the read-in storage circuit to the readout storage circuit during the time that the readout storage circuit is being interrogated, an output from member 66 is taken and applied to a conventional AND gate 110. As member 62 of the read-in register is initially placed in the "1" state, with the fifth read-in shift pulse applied to the read-in storage circuit, this initial "1" state will be transferred from member 66 to member 67. Therefore, an output is always assured at this time. Because during the interrogation of the readout storage circuit there will be an output signal present from flip-flop 95 through output terminal 96, this signal is applied to the other input terminal of AND gate 110. As AND gate 110 is enabled by the coincident application of signals presented to its two input terminals, an output signal is produced and applied to one of the input terminals of flip-flop 111, thereby triggering flip-flop 111 to its "set" condition. In the set condition, the signal appearing at output terminal 112 thereof goes from ground potential to a negative potential, which is applied to input terminal *a* of an inhibitor gate 113, the details of which are identical to inhibitor 25 of Figure 1 and is herein shown in block form. As inhibitor gate 113 is disenabled by this signal, the shift pulse present upon input terminal 56 may not be passed therethrough, hence no shift pulse is applied to read-in shift pulse windings 68–73, inclusive. At the conclusion of the interrogation of the readout storage circuit, with the attendant enabling of inhibitor gate 109, as previously described, the shift pulses produced by free-running multivibrator 97 are passed therethrough and applied as reset pulses to flip-flop 111. As flip-flop 111 is reset, the signal at its output terminal 112 is positive-going from a negative potential which is applied through OR gate 114 and amplifier 115 to the shift coupling windings 68–73, thereby completing the read-in into the read-in storage circuit. In this manner, then, the final read-in pulse is merely temporarily stored in flip-flop 111 until the interrogation has been completed of the readout storage circuit.

While a preferred embodiment of the present invention has been shown and described, it will be obvious to those skilled in the art that various modifications and substitutions may be made without departing from the spirit of the invention which is to be limited only within the scope of the appended claims.

What is claimed is:

1. A binary data translating device for successively storing respective groups of a given plurality of serially received information bits at one rate and from which the stored bits may be removed at another rate, wherein the first bit of each group manifests the same given binary value, said device comprising a multistage first shift register having a capacity for storing a group of said bits applied thereto, first means for applying each of said serially received bits at said one rate to an initial stage of said first shift register to effect the storage therein of the information manifested thereby and immediately following the application of each bit applying a shift pulse to said first shift register to effect the transfer of the information stored in each stage thereof to the next following stage thereof, whereby in response to the application of an entire group of bits the first bit thereof manifesting said given binary value is stored in a certain stage of said first shift register, a multistage second shift register including a separate stage thereof corresponding to each respective stage of said first shift register, second means coupled to said first and second shift registers responsive to the occurrence of a shift pulse applied to said first shift register when the information stored in said certain stage thereof manifests said given binary value for transferring the information stored in each stage of said first shift register to its corresponding stage of said second shift register and clearing said first shift register, third means coupled to said second shift register intermittently operative to serially read out the information stored in said second shift register at said other rate, and fourth means coupled between said first and third means for delaying the application of a shift pulse to said first shift register when said second shift register is being read out and the information stored in the certain stage manifests said given binary value until said second shift register is completely read out.

2. The device defined in claim 1, wherein said other rate is high relative to said one rate, wherein said first means includes an inhibitor gate for passing shift pulses applied thereto in response to a first signal being applied as an input thereto and for preventing the passage of shift pulses applied thereto in response to a second signal being applied as an input thereto, and fifth means coupled to said inhibitor gate for applying the shift pulses passed thereby to said first shift register, wherein said third means includes sixth means for reading out said second shift register only in response to said second signal being applied as an input thereto, and wherein said fourth means includes an AND gate having shift pulses from said first means applied as a first input thereto for passing said shift pulses only in response to said second signal being applied as a second input thereto, a bistable element coupled to said AND gate for applying a shift pulse passed by said AND gate as a first input thereto to switch said bistable element from a first to a second stable condition thereof, said bistable element being switched back from said second to said first stable condition thereof only in response to said first signal being applied as a second input thereto, seventh means for applying in mutually exclusive relationship either one of said first and second signals as an input to said inhibitor gate and said sixth means and as a second input to said AND gate and said bistable element, and eighth means coupled to said bistable element and said fifth means for applying an extra shift pulse to said first register only in response to said bistable element being switched back from said second to said first stable condition thereof.

3. The device defined in claim 1, wherein said other rate is low relative to said one rate, wherein said first means includes an inhibitor gate for normally passing shift pulses applied thereto, and fifth means coupled to said inhibitor gate for applying the shift pulses passed thereby to said first shift register, and wherein said fourth means includes a first bistable element, sixth means for applying a first signal from said second means as a first input to said first bistable element in response to the occurrence of a shift pulse applied to said first shift register when the information stored in said certain stage thereof manifests said given binary value, said first binary element being switched from a first to a second stable condition thereof in response to said first signal being applied as a first input thereto, said third means being coupled to said first bistable element for reading out said second shift register only in response to said first bistable element having said second stable condition thereof, an AND gate coupled to said first bistable element for applying a first input to said AND gate only in response to said first bistable element having said second stable condition thereof, seventh means responsive to the transfer of information manifesting said given binary value from the stage of said first shift register preceding said certain stage to said certain stage for applying a second input to said AND gate, a second bistable element, eighth means coupling said AND gate to said second bistable element for applying a first input to said second bistable element in response to said AND gate having both said first and second inputs applied thereto, said second bistable element being switched from a first to a second stable condition thereof in response to said first input applied thereto, ninth means coupling said second bistable element to said inhibitor gate for rendering said inhibitor gate ineffective in passing shift pulses applied thereto only in response to said second bistable element having said second stable condition thereof, tenth means coupled to said third means for applying a second signal as a second input to both said first and second bistable elements only in response to said second shift register having been completely read out, said first and second bistable elements being switched back from said second to said first stable conditions thereof in response to said second signal being applied as a second input thereto, and eleventh means coupling said second bistable element to said fifth means for applying an extra shift pulse to said first shift register only in response to said second bistable element being switched back from said second to said first stable condition thereof.

References Cited in the file of this patent

UNITED STATES PATENTS

| | | |
|---|---|---|
| 2,800,596 | Bolie | July 23, 1957 |
| 2,805,409 | Mader | Sept. 3, 1957 |
| 2,844,815 | Winick | July 22, 1958 |
| 2,886,799 | Crooks | May 12, 1959 |